Dec. 7, 1948.          R. C. NELSON            2,455,382
              METHOD OF MAKING A PECTIN PRODUCT
Filed Aug. 18, 1943                         5 Sheets-Sheet 1

INVENTOR
BY RICHARD CARL NELSON

Watson, Bristol, Johnson & Leavenworth
ATTORNEYS

Dec. 7, 1948. R. C. NELSON 2,455,382
METHOD OF MAKING A PECTIN PRODUCT
Filed Aug. 18, 1943 5 Sheets-Sheet 2

INVENTOR
BY RICHARD CARL NELSON
Watson, Bristol, Johnson & Leavenworth
ATTORNEYS Dec. 7, 1948. R. C. NELSON 2,455,382
METHOD OF MAKING A PECTIN PRODUCT
Filed Aug. 18, 1943 5 Sheets-Sheet 3

INVENTOR
BY RICHARD CARL NELSON
Watson, Bristol, Johnson-Leavenworth
ATTORNEYS

Dec. 7, 1948.  R. C. NELSON  2,455,382
METHOD OF MAKING A PECTIN PRODUCT
Filed Aug. 18, 1943  5 Sheets-Sheet 4
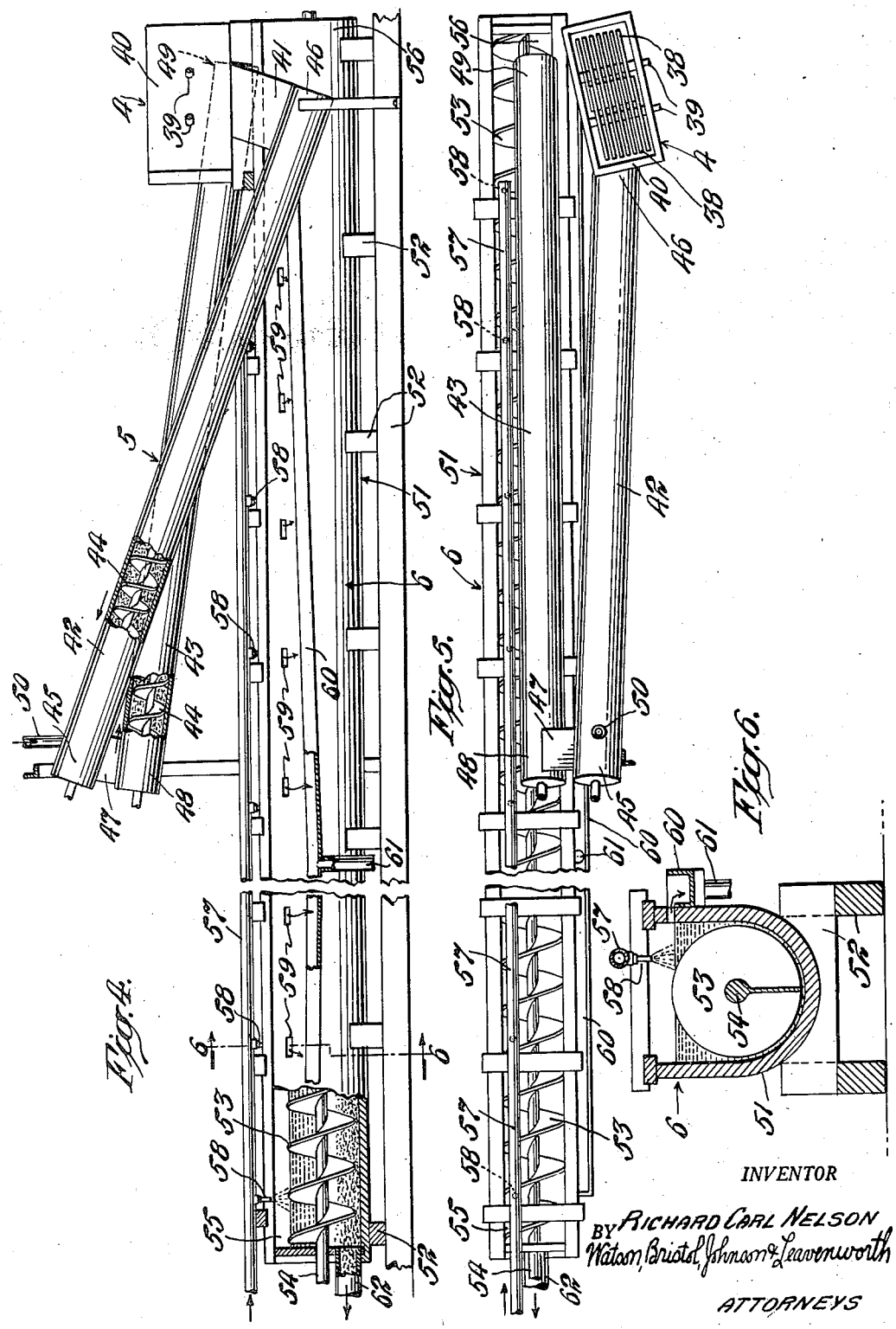
INVENTOR
BY RICHARD CARL NELSON
Watson, Bristol, Johnson & Leavenworth
ATTORNEYS

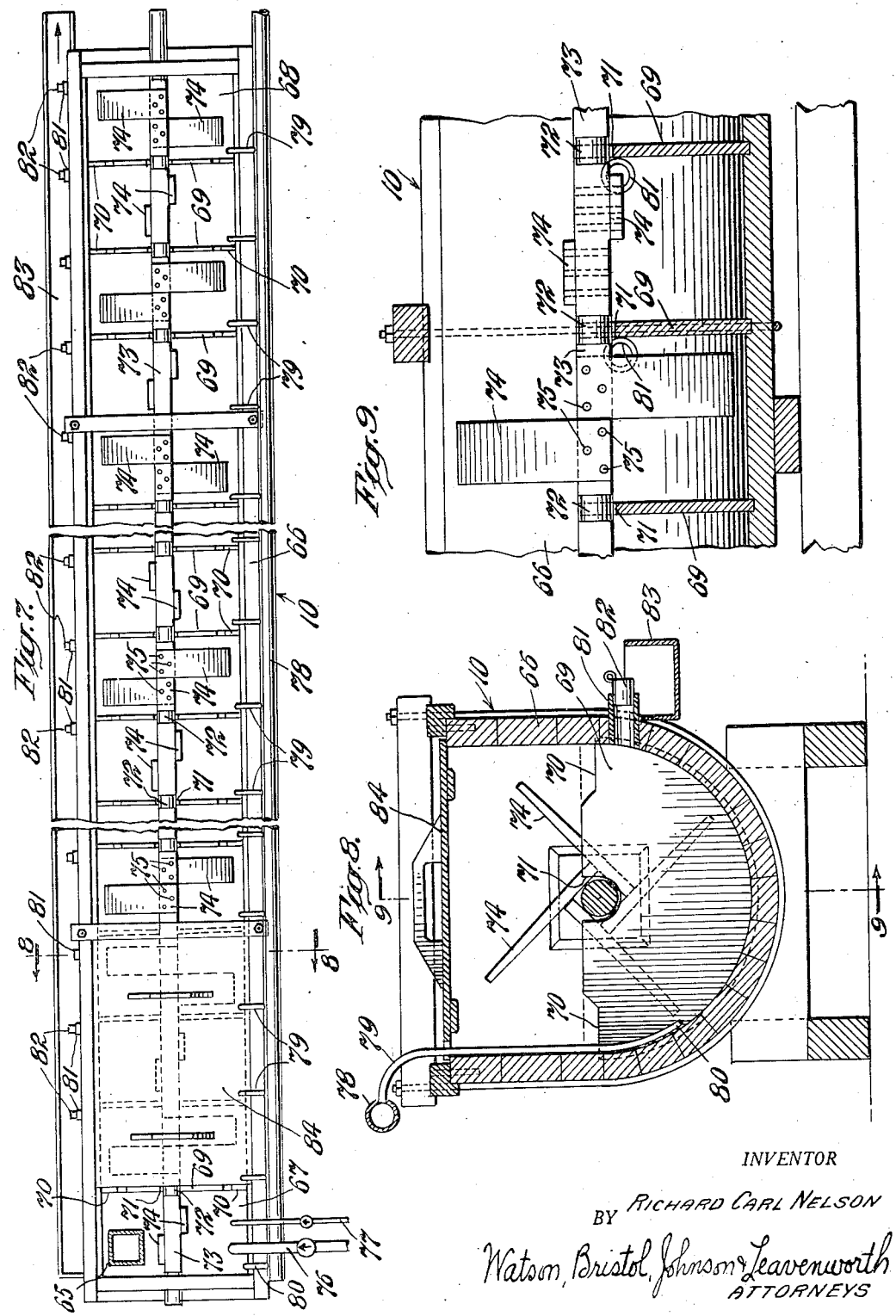

Patented Dec. 7, 1948

2,455,382

UNITED STATES PATENT OFFICE 2,455,382

METHOD OF MAKING A PECTIN PRODUCT

Richard Carl Nelson, Clearwater Beach, Fla., assignor, by mesne assignments, to Juice Industries, Inc., Dunedin, Fla., a corporation of Florida Application August 18, 1943, Serial No. 499,088

12 Claims. (Cl. 260—209.5)

The present invention relates to a method of making a pectin product from citrus fruit peel and apparatus for performing various procedural steps thereof.

A general object of the present invention is the provision of such a method which may be economically practiced in a commercial manner to make a highly satisfactory pectin product from citrus fruit peel without necessitating purifying elimination of sugars, mineral matters and other extraneous matter therefrom prior to finishing for use, featured by such controlled extraction and production as to keep the sugar, mineral and other extraneous matters content below a certain critical maximum at which resulting products may be either inferior, unfit for use or incapable of effective handling in the desired manner of conversion from a pectin bearing extraction liquor to a granular product.

A more specific object of the invention is the provision of such a method which may be carried out in a continuous manner and will assure extraction of a maximum amount of pectin and a low ratio of extraneous matters whereby the resulting product may be satisfactorily employed without necessitating precipitation of pectin from the extraction liquor prior to finishing the product, and which, if desired, may be supplemented without difficulty by a purifying procedure to obtain a product which is largely freed of color, odor, sugars and mineral matters.

Another object of the invention is the provision of such a procedure which by proper adjustment of the pH of the liquor permits efficient spray drying of extraction liquor to obtain a granular product which is satisfactorily soluble and free from damage characteristically evidenced by unsightly discoloration.

A further object of the invention is the provision of such a method which by the use of controlled drying temperatures make effectively employable spray drying of extraction liquor despite a sugar content.

Still another object of the invention is the provision of such a process featured by such control of pH of the extraction liquor, and spray drying temperatures and employment of such rapidity of cooling of granules as to result in the efficient production of a high quality product characterized by substantially spherical granules which are readily soluble to permit easy and efficient production therefrom by the user of a pectin product liquor of superior quality.

A still further object of the invention is the provision in such method of a preheating treatment of peel pieces during continuous travel thereof by steam which effectively destroys the semi-permeable membranes of the living cells in the peel thereby efficiently permitting diffusion out of the peel into wash water of at least certain proportions of sugars and other extraneous or undesirable substances which are in solution in the cell sap and resultant elimination thereof and water-logs peel pieces to permit ready separation therefrom of rag and pulp in wash water by flotation, and a simple and efficient apparatus for carrying out this treatment.

An additional object of the invention is the provision in such a method of a washing procedure which continuously carries peel pieces through flowing wash water with turbulence to carry off by flotation particles of rag and pulp and to dissolve out and remove from the peel at least certain proportions of sugars and mineral matters and other extraneous substances, such as effective elimination of the bitter principle of grapefruit peel, and a simple and effective apparatus for efficiently carrying out this procedure.

A further more specific object of the invention is to provide in such a method a cooking procedure to obtain from citrus fruit peel an aqueous liquor or extract, preferably acidified, having a relatively high content of pectin which is characterized by cooking a mixture of prepared peel pieces and hot acid-containing water, preferably containing an acid additive, while traveling along an elongated path to provide a prolonged cooking period without materially interfering with the continuity of the method, and an apparatus of simple construction which will efficiently perform this procedure.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

Fig. 4 is a side elevational view, with parts broken away and in section, showing the steamer and washer apparatus;

Fig. 5 is a top plan view of the structure shown in Fig. 4;

Fig. 6 is an elevational sectional view taken on line 6—6 of Fig. 4, with parts broken away;

Fig. 7 is a top plan view, with parts broken away and removed, of the cooker apparatus;

Fig. 8 is a sectional elevational view taken substantially on line 8—8 of Fig. 7 but for the purposes of clarity showing the agitator blades in different positions; and Fig. 9 is an enlarged sectional elevational view with parts broken away and in section, taken substantially on line 9—9 of Fig. 8, but with the agitator blades in the positions shown in Fig. 7.

Figure 1:
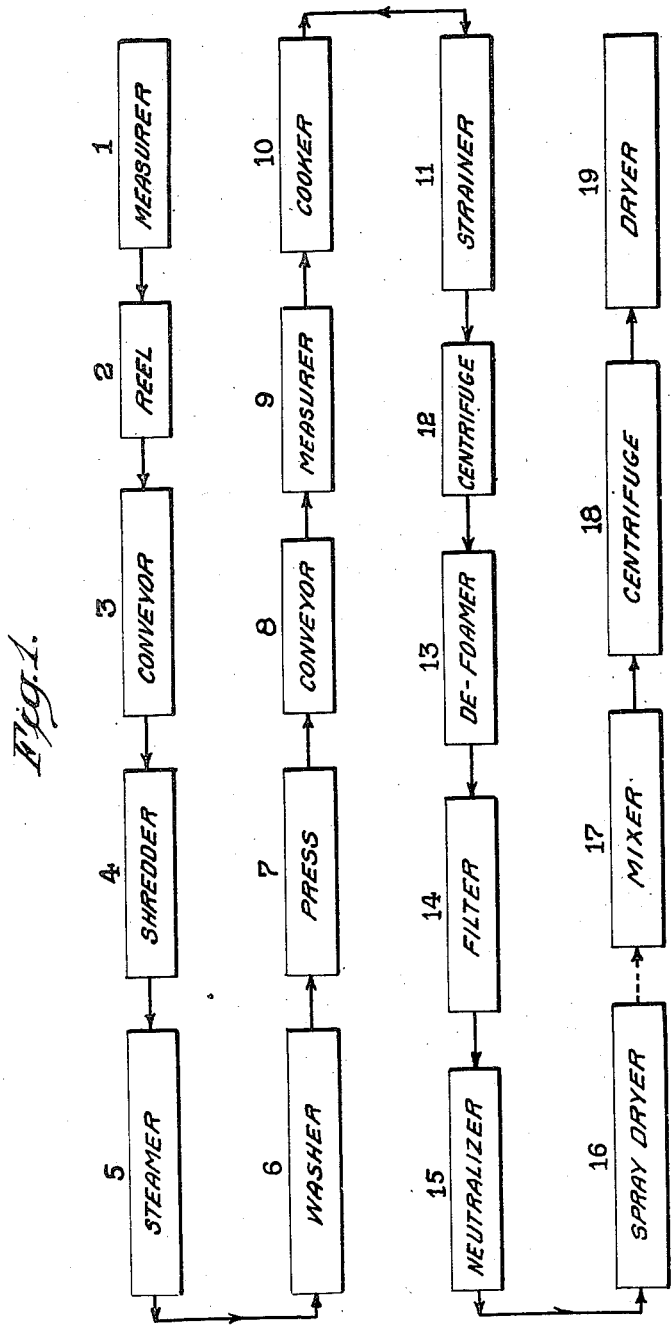
Fig. 1 is a flow diagram indicating the path of material to various parts of the apparatus in the practice of the method of the present invention.

Referring to the drawings, like numerals refer to like parts throughout. In the flow diagram shown in Fig. 1, it is indicated that in the practice of the method of the present invention citrus fruit peel, such as half sections of shell marc, including the peel or rind comprising an outer cell-bearing layer of epicarp and the underlying layer of rag to which clings pieces of shell or pulp of the mesocarp and seeds, are collected from a juice extracting machine and supplied by a measuring device 1 to a reel or inclined perforated rotating drum 2, there to be washed with water for removing all seeds and some pulp particles. The washed marc shells are then fed to a conveyor 3 adapted further to wash them and then to separate out a portion of the wash water and feed the washed marc shells to a shredder 4 where, by means of suitable cooperating gangs of circular blades, by way of example, the marc shells are cut up into pieces or shreds which may be about $\frac{1}{16}''$ wide. The resultant moist shreds are then fed to a steamer 5 where they are subjected to action of steam as they are moved along for a relatively short period of time at a temperature of between about 70° and 90° C. to destroy the semi-permeable membrane of the living cells in the peel permitting diffusion out of the peel pieces into a subsequent wash water of at least certain proportions of sugars and other extraneous or undesirable substances which are in solution in the cell sap so that they can be eliminated during the subsequent washing. This preheating treatment with steam, for example, in the case of grapefruit peel permits subsequent washing out of the bitter principle. The washing is further expedited by the fact that the steamed peel pieces have been water-logged by the steaming which causes them to sink in wash water, permitting full contact with the wash water and floating off of pieces of rag and pulp.

The steamed and water-logged peel pieces or shreds are then delivered by the steamer 5 to a washer 6 where they settle to the bottom to be soaked and washed with water as they travel therethrough to a discharge point at the far end of the washer, while wash water at a temperature of about 25° C. is continuously added to overflow into a waste collector carrying with it floating pieces of rag and pulp. Preferably turbulence is created in the water bath either by the conveyor adapted to move the peel shreds from the intake end to the discharge end of the washer and/or jets supplying the water to the washer. If desired, turbulence in the water bath may also be obtained by submerged jets of air or other gaseous medium. Continuous travel of peel shreds from the intake end to the discharge end of the washer preferably is extended over a relatively long period of time, such as about one-half hour.

A centrifugal pump 20 may be employed to remove a slurry of water and water-logged peel shreds from the bottom of the washer 6 and deliver it upon a vibrating screen 21 adapted to separate a large proportion of the water from the slurry. The vibrating screen 21 is inclined to deliver as it shakes a continuous feed of waterlogged peel pieces to a press 7 which may comprise an endless belt which carries peel pieces thereon between pairs of pressure-applying rollers to squeeze water therefrom.

The resultant pressed peel pieces are collected from the press 7 by conveyor 8, which may comprise an endless belt, and delivered to a measurer 9 preferably consisting of an automatic scale of known construction.

The measurer 9 is adapted to collect weighed quantities of peel shreds therein and periodically to deliver them into the intake end of a cooker 10, although it will be understood that the peel may be fed to the cooker 10 in a continuous stream rather than in successive batches at short intervals. The cooker 10 comprises an elongated structure into the intake end of which the peel is fed with metered amounts of water and acid. The acid may comprise any of those well known to the art as being suitable in the acidified-water extraction of pectin from fruit, such as concentrated hydrochloric acid. The successive batches of peel are mixed with water and acid and flowed along with agitation through the elongated cooker structure to a discharge point and during such travel are subjected to heat to maintain the mixture at a temperature of between about 70° and 80° C. for a cooking period, while traveling through the cooker, of substantial duration, i. e., about one hour, to obtain a viscous mash which may have a pH of between about 1.8 and 2.0. The cooking optimum may be recognized by the employment of viscosity measurements of the mixture in the cooker.

The resultant viscous mash is then continuously delivered from the cooker 10 to a strainer 11, which may comprise an inclined rotating cylindrical screen, which separates undesirable solids from the acidified aqueous extract liquor having a relatively high pectin content. The extract liquor is then fed to a centrifuge 12 of known construction where further solids are separated out and the resulting liquor is fed to a vacuum defoamer 13 from which it is removed by centrifugal pump 22 and by which it is forced through a filter 14, which may be a plate filter press, and then to a neutralizer 15.

The clarified acidified aqueous extract liquor is periodically collected in the neutralizer tank 15 where a suitable alkaline material, such as sodium carbonate, is added thereto to adjust the pH of the liquor to between about 3.7 and 4.4. This pH range is critical since it is desired subsequently to spray dry the product and in the development of the present invention it was unexpectedly found that if the pH of the liquor is below that critical range spray drying produces a relatively insoluble product and if it is higher than that range, damage to pectin results. Such damage is particularly noticeable at a pH of about 5.0. In order to aid in the obtainment of an adjusted pH within the range of about 3.7 to 4.4 the electrodes of a pH meter of well known type may be mounted in the neutralizer tank.

The pH adjusted liquor may then be pumped by a centrifugal pump 23 into the first stage of a spray drier 16. The first stage may be identified as the wet collector and the second stage as a vacuum evaporator. The wet collector and vacuum evaporator are employed to concentrate the pH-adjusted liquor before it is introduced into the third stage constituting the spray drying chamber.

The concentrated liquor is sprayed under high pressure into the spray drier chamber through a small orifice to cause it to break up into fine droplets. The spray is directed into a stream of hot gaseous medium, such as air, which is not in substantial excess of about 300° F., to remove the moisture from the drops to produce globules. At the discharge end of the spray drying chamber the hot globules of spray-dried pectin product are rapidly cooled by cold currents of atmospheric air drawn in through a draft opening by means of a fan 24 which then delivers the cooled globules of pectin product to a collector 25 from which the product may be withdrawn for further heat treatment to alter the setting time thereof or to be packaged for distribution to the consumer or to be further processed for improving the purification thereof. The product collected in the collector 25 is of the "quick-set" type and may, if desired, be changed to a "slow-set" powder by subjecting it to heat at about 70° to 80° C. for about 8 to 12 hours, or the hot powder in the bottom of the spray drier, which may be at a temperature of about 175° F. may be run directly into aging drums to provide a "slow-set" powder.

The spray dried product which is obtained from the spray drier 16 may, if desired, be further purified to obtain a pectin substantially free of color and odor and having a very small percentage of sugars and mineral salts by passing it from the spray drier 16 or from the collector 25 to a mechanical mixer 17 to be there mixed with a quantity of alcohol of about 70 to 80% concentration. The resulting slurry may then be pumped by a centrifugal pump 26 to a centrifuge 18 from which the damp powder is delivered to a suitable drying apparatus 19.

Figure 2:
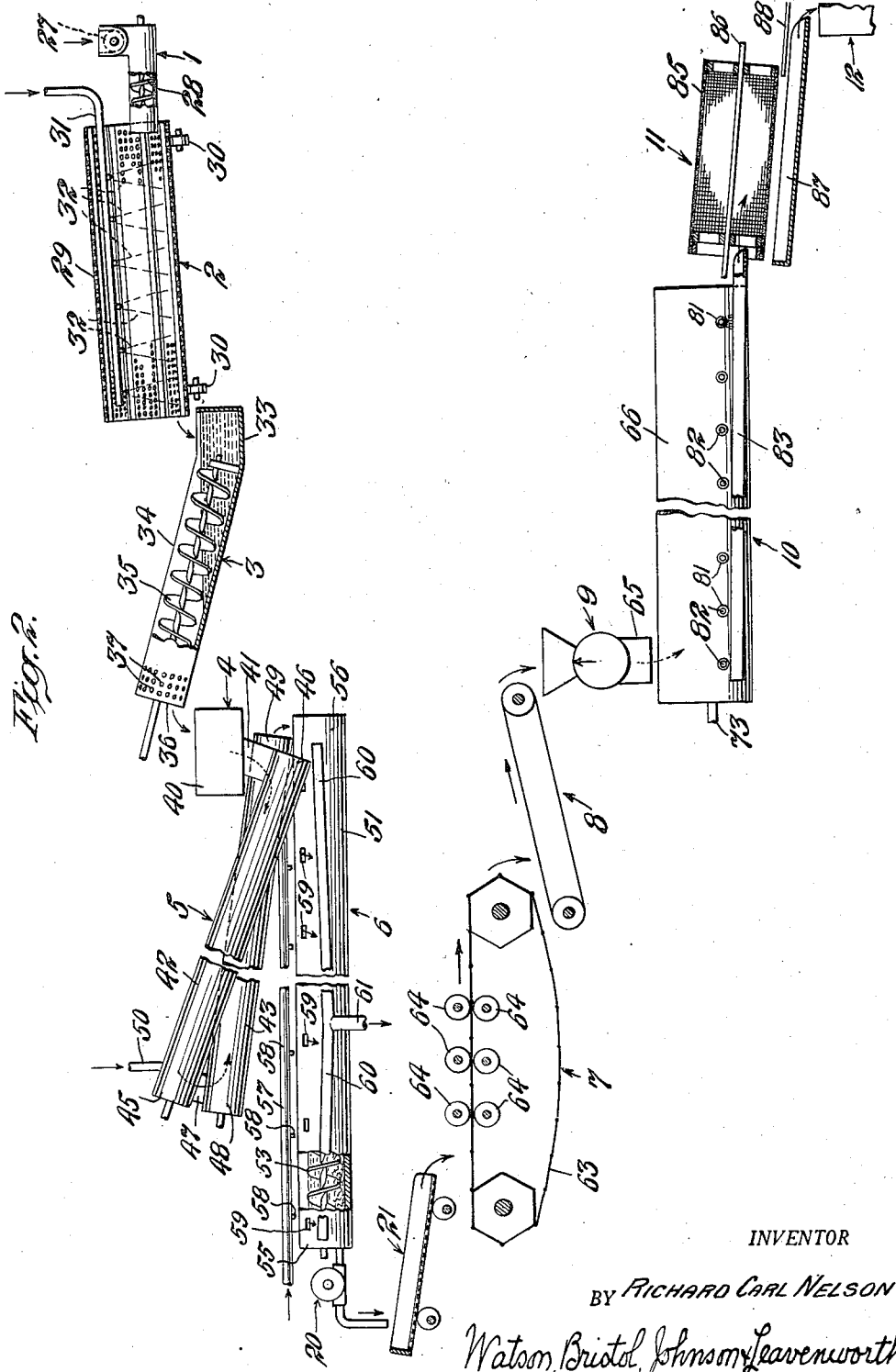
Fig. 2 is a diagrammatic elevational view of parts of the apparatus identified in the flow diagram of Fig. 1, with parts broken away and in section.
Figure 3:
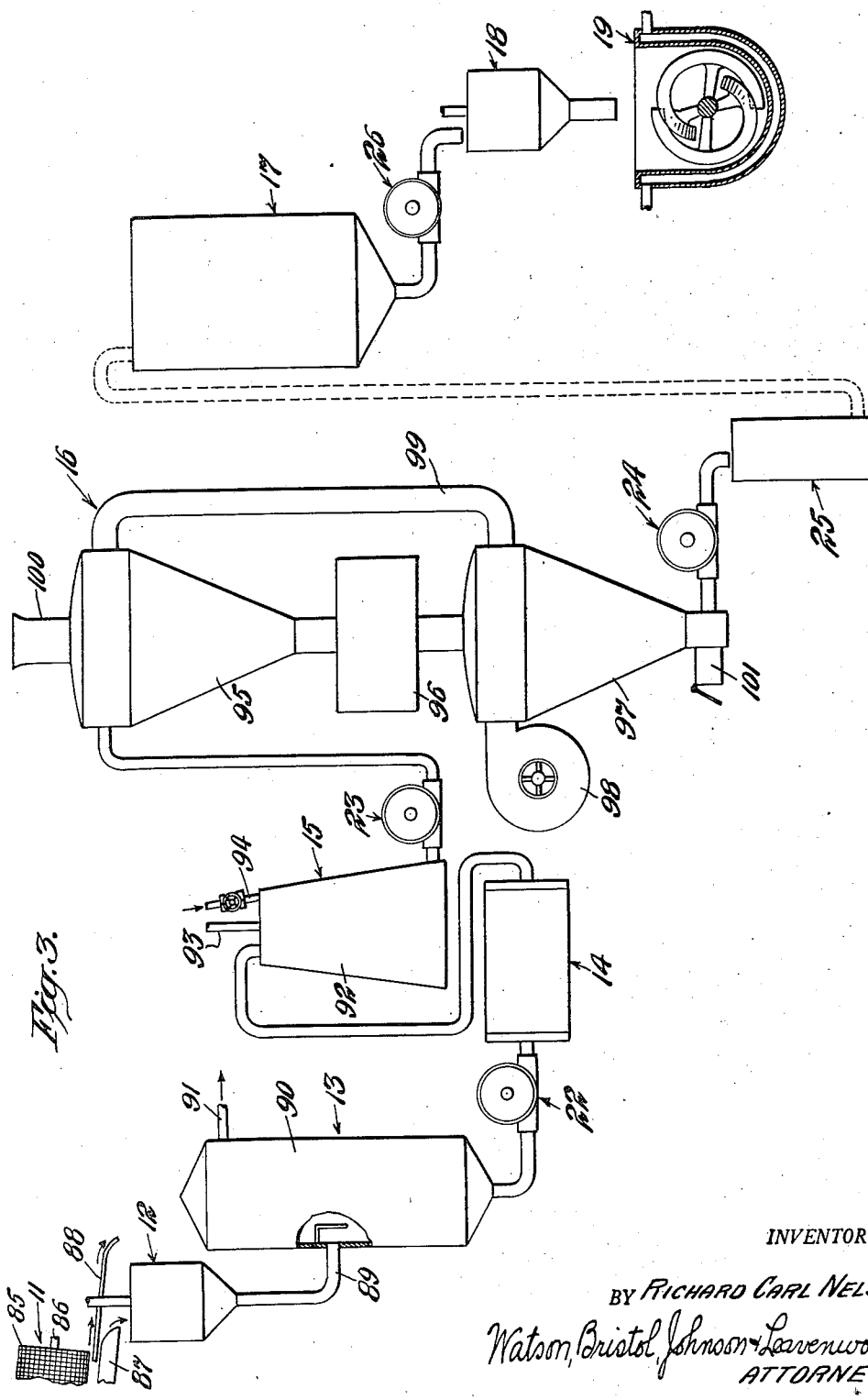
Fig. 3 is a view similar to Fig. 2 of the remaining parts of the apparatus.

The measuring device 1 may, as shown in Fig. 2, comprise a worm feed 27 to deliver marc shells to a controlled speed cross-feed worm 28. The speed at which worm 28 is rotated governs the amount of marc shells continually delivered to the reel 2.

The reel 2 comprises a perforated drum 29 which may be about 3 feet in diameter and about 10 feet long having the intake end thereof elevated about 6 inches above the discharge end. This drum 29 may be rotated on rollers 30—30 and may be provided with about 25 one inch perforations per square foot of surface. A pipe 31 may supply water to the interior of the drum 29, such as by means of a plurality of sprays 32—32.

The conveyor 3 may comprise a receiving box 33 connected to the intake end of an inclined tube 34 in which a worm 35 rotates to move marc shells to the discharge end 36 which may be provided with a plurality of drainage holes 37—37 as shown.

The shredder 4 may, as shown in Fig. 5, comprise two gangs of circular blades 38—38 having serrated edges, each gang being mounted with suitable spacers upon a rotatable shaft 39 with the blades of one gang interlapped with those of the other. Both gangs of blades are rotatably mounted in a suitable casing 40 which may be provided with a discharge chute 41 leading to the intake end of the steamer apparatus 5.

The steamer apparatus 5, as shown in Figs. 4 and 5, comprises a pair of tubular shells or enclosing casings 42 and 43 in each of which a conveyor screw 44 is mounted. These shells 42 and 43 may comprise elongated cylinders about a foot in diameter and about 20 feet long and the screws 44, 44 may have a lead of about a foot and each be rotated by its respective shaft at a speed of about 16 R. P. M. The discharge end 45 of the shell or enclosing casing 42 is elevated above the receiving end 46 with the axis of the screw 44 inclined as shown. In a typical apparatus of this feature of the invention having the approximate dimensions indicated above this elevation of the discharge end 45 of the enclosing casing 42 above the receiving end 46 may be about 7 feet. The discharge end 45 is connected by chute 47 to the receiving end 48 of the second enclosing casing 43. The connections of the chute 47 to the discharge end 45 and the receiving end 48 are made gas-tight for a purpose to be hereinafter indicated. The receiving end 48 of the enclosing casing 43 in a typical structure approximately dimensioned as indicated above may be elevated about 3 feet above its discharge end 49. A pipe 50 is connected to the resultant enclosing structure in the vicinity of the portion at highest elevation, that is, connecting discharge end 45 and receiving end 48, preferably into the top of the shell 42 at the discharge end 45 thereof, as shown in Figs. 4 and 5.

In operation the steaming apparatus 5 is adapted to receive at 46 a continuous supply of shredded citrus fruit peel which is moved by screw 44 up through the enclosing casing 42 to be dumped through the chute 47 into the enclosing casing 43 and then moved theredown by the other screw 44, to the discharge end 49. This apparatus is designed to cause a particular mass of peel shreds to travel this path in a relatively short period of time, such as a few minutes. Steam is supplied through pipe 50 to flow down enclosing casing 42 countercurrent to the peel shreds moving upwardly by means of screw 44 to drive air out through the receiving end 43 such as by way of the shredder discharge chute 41 and up through the shredder 4. Steam also passes down through chute 47 into casing 43 and travels along with the shreds being moved therethrough to the open discharge end 49. As a result the peel shreds are thoroughly subjected to the action of steam and the temperature thereof is raised to about 70° to 90° C. for a period of a few minutes without interfering with the continuity of movement thereof. By way of example this treatment may be a steam heating of the peel shreds to a temperature of about 85° C. for about 2 minutes.

This heating of the shredded peel destroys the semipermeable membranes and the living cells in the peel so that a certain minimum amount of sugars and other extraneous or undesirable substances in solution in the cell sap may be effectively diffused out into the wash water for subsequent elimination. This is of importance in the making of the pectin product since the method hereinabove outlined is not characterized by an essential step of precipitation of pectin by aluminum salt or alcohol as is commonly practiced in the prior art. It is intended that the product, resulting from spray drying of the liquor extracted from the peel shreds preheated by this steam treatment, is to be usable as produced and accordingly the sugar content must be kept below an amount which would result in the production of a product evidencing the undesirable characteristics of excessive caramelization which makes for insolubility. Further such steam treatment of grapefruit peel will permit subsequent washing out of the bitter principle without requiring additional treatment to accomplish this desired end. The steaming of the peel pieces also water-logs them so that they will sink in wash water, thus greatly facilitating washing, and making possible and practical separation of particles of rag and pulp therefrom by flotation.

The discharge end 49 of the steamer 5 is located above the receiving end of the washing apparatus 6, as shown in Figs. 4 and 5. This apparatus comprises an elongated trough 51, preferably constructed of wood, mounted substantially horizontally upon suitable supports 52—52. A typical embodiment of this apparatus may be about 65 feet long having a conveyor screw 53 therein adapted to be rotated at a relatively slow speed, such as about 2 R. P. M., by its shaft 54. The screw 53 may extend from the discharge end 55 of the trough 51 to the receiving end 56 thereof, as shown. This screw 53 may be about 2 feet in diameter and have a lead of about 2 feet so as to move the peel shreds from the receiving end 56 slowly through the wash water to the discharge end 55 for a relatively long period, for example, about one-half hour. Water may be supplied to the trough 51 by means of an overhead pipe 57 which may be fitted with a plurality of nozzles 58—58 to spray the water into the trough and the trough is preferably provided with a plurality of overflow slots 59—59 which are adapted to spill water into a trough 60 connected to a discharge conduit 61.

In operation of the washing apparatus 6, the steam-treated water-logged peel shreds are dumped from the discharge end 49 of the steamer 5 into the receiving end 56 of the washer 6. They sink to the bottom of the trough 51 and are slowly moved along to the discharge end 55 by the screw conveyor 53 to the discharge pipe 62 where they are drawn off with water, such as by means of the centrifugal pump 20 to a strainer 21. The slowly rotating screw conveyor 53 may create some turbulence in the water bath as do the overhead sprays of water from the nozzles 58—58. Additional or other turbulence may be created in the water bath by submerged air jets and with the provision of the latter, means other than spray nozzles 58—58 may be employed to supply water to the trough 51, or both types of jets may be used if desired. Treatment of the peel shreds in the water bath results in extraction of non-pectin material. A proportion of the sugars and mineral matters are removed thereby and other extraneous material such as the bitter principle of grapefruit peel may be eliminated from the peel shreds by the wash water. Particles of rag and pulp freed from the peel shreds will float in the water bath and thus by flotation will be removed with the water overflowing through slots 59—59 to the trough 60. Peel shreds which are removed through the discharge pipe 62 thus have their sugar and mineral matters content reduced below a certain critical maximum so that a liquor extracted therefrom in the cooker may be spray dried to provide a satisfactory product ready for use. It is preferred to use water in the washer 6 at a temperature of about 25° C.

After the slurry of peel shreds and water is pumped from the washer 6 and fed to the vibrating screen 21, there to remove a proportion of the water, it is dumped upon the moving belt 63 of a Louisville press to be carried between pairs of rollers 64—64 to press out a major proportion of the water in which is dissolved the non-pectin materials which it is desired to eliminate from the peel shreds.

The conveyor 8 receives peel shreds from the press 7 and delivers them to a measuring device 9 which may be an automatic scale of known construction adapted to receive a continuous feed of peel shreds and collect them into successive batches, accurately weighing a predetermined amount, and then periodically to dump them out through a discharge chute 65 into the receiving end of a cooker 10, details of which are shown in Figs. 7, 8 and 9.

The cooker 10 preferably comprises an elongated substantially horizontal wooden tank or trough 66 which in a typical embodiment may be about 75 feet long and about 3 feet wide and deep. This elongated tank from the receiving end 67 to the discharge end 68 is preferably divided into a plurality of compartments by a plurality of partitioning walls 69—69 which, in a typical embodiment, may provide compartments about 1½ feet long and an equal dimension in depth. The partitions 69—69 are preferably shaped to provide notches 70—70 on both sides of the trough 66 so that cooking mash may overflow from compartment to successive compartment. The medial portions of the partitions 69 are preferably provided with notches 71—71 each to receive a rounded portion 72 of a longitudinally extending shaft 73.

The shaft 73 may be formed in two pieces with an end of each extending through an end wall of the tank 66 to be driven by suitable means. The shaft 73 between cylindrical portions 72—72 preferably is made square in cross-section to provide for easy mountation of agitator blades 74—74 in each compartment. These blades 74—74, as shown in Figs. 8 and 9, may be readily mounted to a face of the shaft 73 by means of pins 75—75.

At the intake end 67 of the cooker 10 a water supply pipe 76 and an acid supply pipe 77 are provided continuously to supply metered amounts of hot water and acid to the first compartment there to be mixed with the peel shreds dumped through the scale discharge 65.

Heat is to be supplied to the mixture as it is flowed along the trough 66 from the intake end 67 to the discharge point and this may be accomplished in any of a number of well known ways. However, it is preferred to provide a steam pipe 78 fitted with a plurality of conduits 79 each leading down into one of the successive compartments and terminating in a nozzle 80 below the overflow notch 70 to provide a submerged steam jet. A gated discharge opening is provided for each compartment so that the length of travel of the mash through the cooker may be selected or altered at will. These discharge means may comprise plugged openings in the bottom of the compartments but as shown in Figs. 7, 8 and 9 preferably comprise discharge tubes 81—81 let in through the side wall of the tank 66. Each discharge tube 81 may be closed by any suitable means, such as by a plug 82 and an inclined trough 83 is mounted below the outer ends of the discharge tubes 81—81 to receive mash from any selected one thereof to deliver it to strainer 11. Cover sections 84—84 are preferably provided to cover the entire tank except the first compartment at the receiving end 67.

In operation the cooker 10 periodically, say every minute or two, receives from the automatic scales 9 a measured charge of prepared peel shreds through the scale discharge chute 65 and a metered amount of hot water and acid, such as hydrochloric acid. These materials are mixed together in the first compartment at the receiving or intake end 67 by agitators 74—74 and further by turbulence produced by a submerged steam jet coming from the nozzle 80 therein. These materials are partially cooked therein and as the materials fill the first compartment up to the level of the notches 79, 79 further addition of materials causes an overflow into the second compartment. Continual addition to the first compartment causes the fed materials to collect in each compartment and overflow from compartment to successive compartment and to cook therein to produce a viscous mash which is drawn off at a selected point of discharge through a selected discharge pipe 81. The variation in the length of path along which the viscous mash flows through the cooker 10 accomplishes a variation in the cooking period of time. Cooking of a typical run may be performed at a temperature between about 70° and 80° C. for about one hour with substantially constant agitation of the viscous mash.

In a typical cooking apparatus where the trough has a constant capacity, if the rate of introduction of water and peel be increased or decreased the time during which any particular portion of the mixture is in the trough and cooked during its passage therethrough will be correspondingly decreased or increased. If a particular rate of feed of materials into the first compartment is maintained, increasing or decreasing the number of compartments in actual use will lengthen or shorten the cooking period. This makes it possible either by adjusting the length of the path of travel or the rate of feed to adjust the cooking time to an optimum value which optimum during continuous operation may vary. This optimum may be recognized by the employment of viscosity measurements of the mash in the cooker and adjustments can be made accordingly. Citrus fruit peel of differing characteristics will require different conditions in the cooker. For example, a relatively hard peel will dictate the employment of relatively high cooking temperatures and less acidity while a softer peel will dictate the use of relatively lower cooking temperatures and higher acidity.

The viscous mash is flowed from the cooker 10 through discharge trough 83 into a rotating cylindrical strainer 85 of strainer 11, supported on an inclined axially arranged shaft 86. The cylindrical strainer 85 may be formed of 100 mesh stainless cloth and extraction liquor which flows therethrough to a collection trough 87 is delivered to the centrifuge 12. The solid matter separated from the extraction liquor may be discharged at the lower end of the cylindrical screen 85 on to suitable discharge means 88. The cylindrical screen 85 may be internally provided with flights or fels to tumble the solid material. About 60% of the viscous mash drawn off from the cooker is thus separated out as extraction liquor containing about 1 to 2% peel solids. The centrifuge 12 separates out these peel solids.

The extraction liquor is then fed through a pipe 89 into tank 90 of the defoamer 13, the discharge end of the pipe 89 being baffled as shown. A pipe 91 at the top of the defoamer tank 90 is connected to suitable evacuating means to create a partial vacuum therein. This extraction liquor is defoamed to permit subsequent efficient filtering thereof.

Centrifugal pump 22 forces defoamed extraction liquor, to which is added, if desired, a suitable filtering material such as Dicalite 4200, through the plate filter press 14 of known construction to the neutralizer 15 which comprises a tank 92 having therein agitator blades fixed to a rotatable shaft 93. Extraction liquor, which may have a pH of about 1.8 to 2.0, is fed into the neutralizer 15 and alkaline material, such as sodium carbonate, is supplied thereto through a pipe 94 to adjust the pH of the liquor to the critical range of between about 3.7 and 4.4. This is determined by the employment of a suitable pH meter having its electrodes mounted within the tank 92.

The pump 23 draws off the pH-adjusted liquor from the bottom of the neutralizer tank 92 and forces it into the first stage 95 of the spray drier constituting a wet collector. The discharge bottom of the wet collector feeds to a vacuum evaporator 96 which in turn feeds into the top of the third stage 97 which constitutes the spray drying chamber. A blower 98 supplies hot air at a temperature not in substantial excess of about 300° F. to the top of the spray drier chamber 97. A conduit 99 connects the top of the spray drier 97 to the top of the wet collector 95 for the purpose of carrying the hot air to the latter and any stray powder that may be entrained therein. The air after entrained powder is freed therefrom, is then exhausted to atmosphere through a stack 100 at the top of the wet collector 95.

In operation, extraction liquor is concentrated as it is fed down through the wet collector and vacuum evaporator and the concentrated liquor is then sprayed into the spray drying chamber 97 under relatively high pressure of, for example, several thousand pounds per square inch. Hot air is supplied to the spray drying chamber at about 290° to 300° F. so that droplets of liquor sprayed through a fine orifice thereinto will dry into spherical globules and drop to the bottom of the spray drying chamber, there to be removed at a temperature of about 170° to 180° F.

In order to avoid the overheating of particles of spray dried powder, since overheating decreases solubility (overheated particles will merely swell rather than dissolve, rapid cooling of the powder at the discharge end of the spray drying chamber is accomplished by a draft of large volumes of air by means of the blower 24 through the dampered inlet blank. By this means the powder is rapidly cooled to a temperature of about 40° C., then to be discharged into the collector 25. The resultant powder is a "quick-set" product due to the rapid cooling which avoids prolonged exposure to high temperatures in the collector. This powder thus may constitute a finished "quick-set" product consisting of both pectin and incidental sugars and mineral salts. The quality or grade of this product is dependent upon keeping the proportion of pectin to non-pectin solids high; the features of drying the liquor, the pH of which has been adjusted to the critical range of 3.7 to 4.4; the drying of the liquor in such a way that during the process of transformation of droplets into dry globules the material is not subjected to temperatures capable of causing any appreciable caramelization of the sugars present; and the rapid cooling of the globules before they are placed in a container, or collected, to avoid the production of insoluble particles or a "slow-set" product. Drying temperatures which are not in substantial excess of about 300° F. have been found to avoid excessive caramelization of sugars in the droplets as they are sprayed into the spray drying chamber. The steam pretreatment and subsequent water extraction of a proportion of the sugar content reduces the latter to or below a certain permissible maximum so that such caramelization of sugars in the spray drier as will always occur, although not excessive, will not result in the production of a product which has an excessive insolubility characteristic.

By way of example, the present invention has been practiced in the following continuous manner. Orange marc shells have been withdrawn from a juice extractor by the measurer 1 at the rate of about 60 pounds per minute and delivered to the reel 2 where the peel was agitated and sprayed for approximately one minute. The peel was then carried by the conveyor 3 and agitated with water therein for about 20 seconds and then delivered to the shredder 4. The peel left the shredder in strips of about $\frac{1}{16}$" wide and dropped into the steamer 5 where it was held in contact with steam for about 2 minutes and delivered at a temperature of about 85° C. into the washer 6. The resultant water-logged peel shreds remained in the washer for about 35 minutes in contact with water at about 25° C. A resultant slurry of peel shreds and water was then pumped from the washer 6 to the agitator screen 21 and the solids fed therefrom to the press 7. The peel shreds left the press 7 with a dry matter content of about 17%.

The conveyor 8 then delivered the peel shreds to the automatic scale 9 which delivered weighed amounts at intervals of about 100 seconds to the cooker 10, which was equivalent to a rate of feed of about 30 lbs. per minute. Hot water at about 90° C. was supplied to the cooker at the rate of about 15 gallons per minute and concentrated hydrochloric acid supplied to the cooker at the rate of about 180 cubic centimeters per minute. The resulting mixture was cooked in the cooker 10 for about one hour as it traveled to the discharge point. This mixture had a pH of about 1.9 and the cooking was carried out at a temperature of about 75° C. maintained substantially throughout the path of travel by the employment of submerged steam jets.

The resulting viscous mash was delivered into the strainer 11 where it was drained for about 30 seconds. The extract liquor flowed away from the strainer 11 at a rate of about 12 gallons per minute and this liquor was found to have a suspended solids content of about 2% by volume. This extract liquor was then centrifuged in a Sharples super-centrifuge rotating at about 17,000 R. P. M., which resulted in a reduction of the suspended solids content to about three-tenths of one percent. The centrifuged liquor was then defoamed in the defoamer tank by a vacuum of about 28 inches and the temperature of the liquor at this point was found to be about 60° C. About 0.5% by weight of Dicalite 4200 was added to the warm defoamed liquor and it was then forced through the plate filter press at a pressure of about 50 pounds per square inch. The liquor which was then substantially free from all suspended solids was found to contain about 1.2% dry matter, 60% of which was pectin.

This liquor was neutralized in the neutralizer 15 with sodium carbonate to a pH of about 4 and was then spray dried by a Grey-Jensen process spray drier under conditions which gave a three to one concentration of liquid in the wet collector. The main drying cone of the spray drier was operated at a top temperature of about 295° F. and a bottom temperature of about 175° F. The liquor was sprayed into the spray drying chamber at a pressure of about 5,000 pounds per square inch through an orifice 0.0475" diameter. The resulting powder was then rapidly cooled by air blast to a temperature of about 40° C. before it was delivered to the collector. The resulting product was found to be of excellent quality and suitable for use without further treatment.

Further clarification of a portion of this product was accomplished by the addition to a quantity of about 200 pounds thereof of about 2,000 pounds of 70% alcohol which were thoroughly mixed together in mixer 17 for about 15 minutes with a high speed stirrer. The solids were then separated from the resultant slurry in the basket centrifuge 18, and the solids were then dried in the drier 19 at about 85° C. for about 15 minutes. The resulting product was found to be a highly purified pectin product substantially free of color and having a very slight content of sugars and a greatly reduced content of mineral salts.

It will thus be seen that the objects set forth above, among others, are efficiently attained by the practice of the method of the present invention and the employment of the apparatus disclosed which effects this procedure and, since certain changes in carrying out the above process and in the construction set forth, which embody the invention, may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of making a pectin product comprising extracting from citrus fruit peel an aqueous pectin liquor having a relatively high pectin content, adjusting the pH of the liquor to between about 3.7 and 4.4, and spray drying the pH-adjusted liquor.

2. A method of making a pectin product comprising extracting from citrus fruit peel an aqueous pectin liquor having a relatively high pectin content, adjusting the pH of the liquor to between about 3.7 and 4.4, spray drying the pH-adjusted liquor to form granules, and rapidly cooling the resultant product.

3. A method of making a pectin product comprising extracting from citrus fruit peel an aqueous pectin liquor having a relatively high pectin content, adjusting the pH of the liquor to between about 3.7 and 4.4, and spray drying the pH-adjusted liquor in a gaseous medium at a temperature which is not in substantial excess of about 300° F.

4. A method of making a pectin product comprising extracting from citrus fruit peel an aqueous pectin liquor having a relatively high pectin content, adjusting the pH of the liquor to between about 3.7 and 4.4, spray drying the pH-adjusted liquor in a gaseous medium at a temperature which is not in substantial excess of about 300° F. to form granules, and rapidly cooling the resultant product.

5. A method of making a pectin product comprising extracting from prepared pieces of citrus fruit peel an acidified aqueous pectin liquor having a relatively high pectin content by cooking prepared peel with acid-containing water, separating peel solids from the acidified aqueous pectin liquor, adjusting the pH of the liquor to between about 3.7 and 4.4, and spray drying the the pH-adjusted liquor.

6. A method of making a pectin product comprising extracting from prepared pieces of citrus fruit peel an acidified aqueous pectin liquor having a relatively high pectin content by cooking prepared peel with acid-containing water, separating peel solids from the acidified aqueous pectin liquor, adjusting the pH of the liquor to between about 3.7 and 4.4, spray drying the pH-adjusted liquor to form granules, and rapidly cooling the resultant product.

7. A method of making a pectin product comprising extracting from prepared pieces of citrus fruit peel an acidified aqueous pectin liquor having a relatively high pectin content by cooking prepared peel with acid-containing water, separating peel solids from the acidified aqueous pectin liquor, adjusting the pH of the liquor to between about 3.7 and 4.4, and spray drying the pH-adjusted liquor in a gaseous medium at a temperature which is not in substantial excess of about 300° F.

8. A method of making a pectin product comprising extracting from prepared pieces of citrus fruit peel an acidified aqueous pectin liquor having a relatively high pectin content by cooking prepared peel with acid-containing water, separating peel solids from the acidified aqueous pectin liquor, adjusting the pH of the liquor to between about 3.7 and 4.4, spray drying the pH-adjusted liquor in a gaseous medium at a temperature which is not in substantial excess of about 300° F. to form granules, and rapidly cooling the resultant product.

9. A method of making a pectin product comprising preparing pieces of citrus fruit peel, cooking the prepared peel pieces with acid-containing water as they are agitated, separating peel solids from the resulting acidified aqueous pectin liquor, adjusting the pH of the liquor to between about 3.7 and 4.4, and spray drying the pH-adjusted liquor.

10. A method of making a pectin product comprising preparing pieces of citrus fruit peel, cooking the prepared peel pieces with acid-containing water as they are agitated, separating peel solids from the resulting acidified aqueous pectin liquor, adjusting the pH of the liquor to between about 3.7 and 4.4 by the addition of alkaline material, and spray drying the pH-adjusted liquor.

11. A method of making a pectin product comprising extracting from citrus fruit peel an acidified aqueous pectin liquor having a relatively high pectin content, adjusting the pH of the liquor to between about 3.7 and 4.4 by the addition of alkaline material, and spray drying the pH-adjusted liquor.

12. A method of making a pectin product comprising simultaneously agitating and spraying with water citrus fruit marc shells to free them from seeds and loose particles of pulp, shredding the cleansed marc shells, subjecting the resultant shreds to the action of steam for a period of a few minutes to heat a mass thereof to a temperature between about 70° and 90° C., washing the shreds in water at a temperature of about 25° C. for a period of about a half hour to permit elimination of particles of rag and pulp from water-logged shreds of peel by flotation, pressing water-logged peel shreds to remove a large proportion of the water, feeding the resultant peel to a cooker and introducing therewith hot water and acid, subjecting the resultant mixture to the action of submerged steam jets to maintain it at a temperature of between about 70° and 80° C. for a cooking period of about an hour with substantially constant agitation to obtain a viscous mash having a pH of between about 1.8 and 2.0, straining and centrifuging the mash to obtain an acidified aqueous liquor having a relatively high pectin content, defoaming and filtering the liquor, adjusting the pH of the liquor to between about 3.7 and 4.4 by the addition of alkaline material, spray drying the pH-adjusted liquor in a gaseous medium at a temperature which is not in substantial excess of about 300° F. to form granules, and rapidly cooling the resultant product.

RICHARD CARL NELSON.

REFERENCES CITED

The following references are of record in the file of this patent:

UNITED STATES PATENTS

| Number | Name | Date |
|---|---|---|
| 83,389 | Johnson | Oct. 27, 1868 |
| 244,517 | Axline | July 19, 1881 |
| 959,448 | Baxter | May 31, 1910 |
| 1,386,224 | Barker | Aug. 2, 1921 |
| 1,457,417 | Babcock | June 5, 1923 |
| 1,745,291 | Bleil | Jan. 28, 1930 |
| 1,941,349 | Hawerlander | Dec. 26, 1933 |
| 1,975,998 | Wilson | Oct. 9, 1934 |
| 1,999,411 | Haney | Aug. 30, 1935 |
| 2,008,999 | Wallerstein | July 23, 1935 |
| 2,029,690 | Wilson | Feb. 4, 1936 |
| 2,132,577 | Olsen | Oct. 11, 1938 |
| 2,151,710 | Mills | Mar. 28, 1939 |
| 2,173,260 | Leo et al. | Sept. 19, 1939 |
| 2,200,192 | Sipe | May 7, 1940 |